Sept. 12, 1950  E. O. KOLLMORGEN  2,522,280
PERISCOPE MOUNT

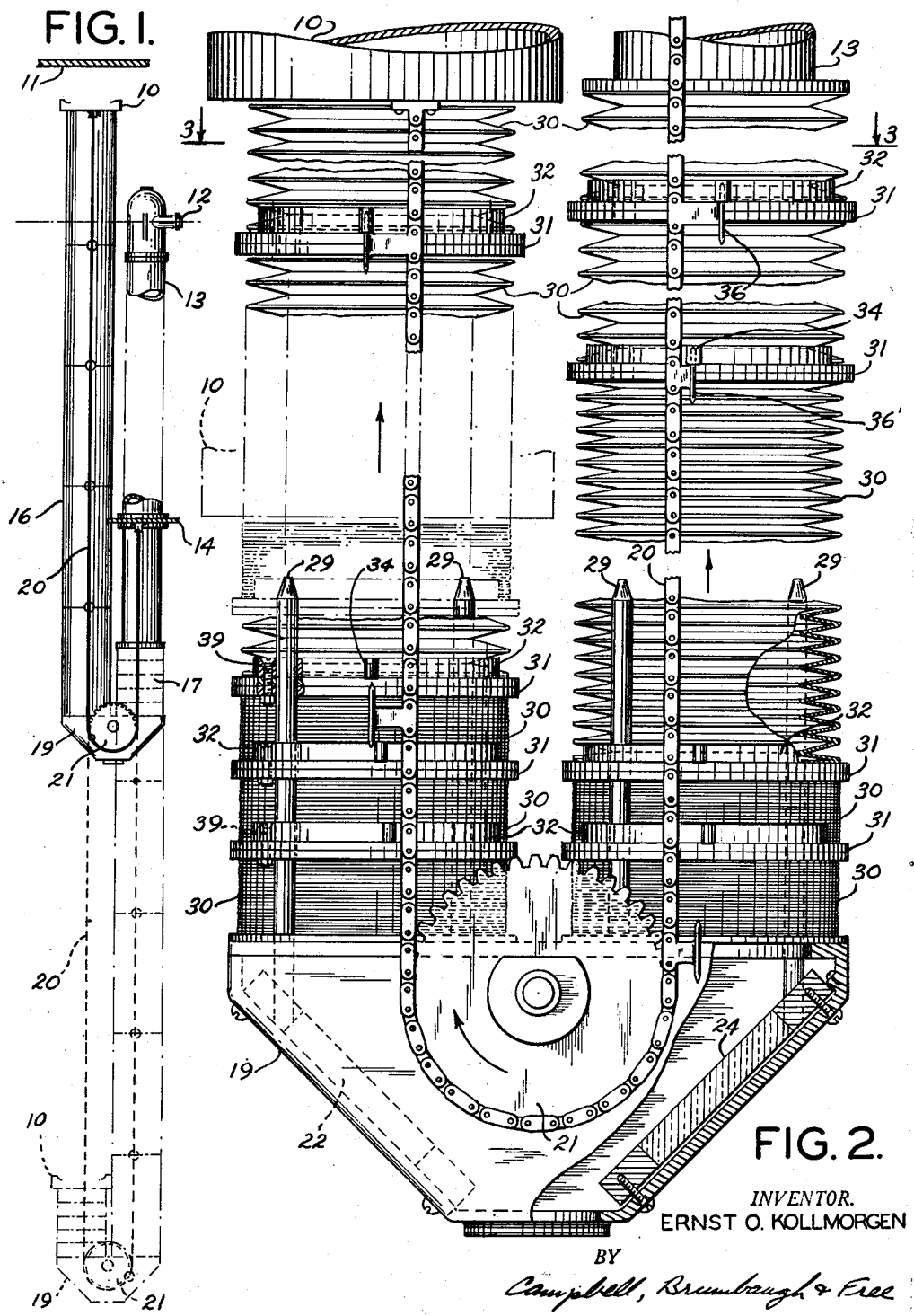

Filed Feb. 7, 1948  2 Sheets-Sheet 2

INVENTOR.
ERNST O. KOLLMORGEN
BY
Campbell, Brumbaugh & Free
ATTORNEYS.

Patented Sept. 12, 1950

2,522,280

UNITED STATES PATENT OFFICE 2,522,280

PERISCOPE MOUNT

Ernst O. Kollmorgen, Mountain Lakes, N. J., assignor to Kollmorgen Optical Corporation, Brooklyn, N. Y., a corporation of New York Application February 7, 1948, Serial No. 6,970

8 Claims. (Cl. 88—68)

This invention relates to an improvement in periscope mounts and particularly to an extensible enclosure for the optical system of a submarine periscope.

Submarine periscopes includes an elongated tubular member which is mounted for elevation and retraction in bearings and in suitable waterproof seals and gaskets in the conning tower or superstructure of a submarine. This tubular member, referred to hereinafter as a periscope tube, is projected and retracted by means of a suitable hoisting apparatus usually including a pair of suspended hydraulic jacks.

Inasmuch as it is extremely desirable to maintain the eyepiece or viewer of the periscope at about the same distance above the control deck of a submarine and the periscope must be operable at various positions of the periscope tube, it has previously been proposed to construct to at least the lower portion of the periscope tube of telescoping tubular elements and, in order to give a wider range of operation, to provide a U-shaped optical path down from the base of the periscope tube and up to the eyepiece, said U-shaped optical path being enclosed in telescoping tubes of variable length.

These arrangements, and particularly the latter, have a number of inherent disadvantages. They are extremely heavy and difficult to manipulate, they enclose a relatively large quantity of air, all of which must be kept free from dust and condensable moisture, and the air pressure within the system will vary considerably depending upon the position of the periscope tube and thereby add to the difficulty of manipulating the system.

It has now been found that these disadvantages can be overcome by providing bellows or the like to enclose the optical path between the base of the periscope tube and the eyepiece. This invention is applicable particularly to periscopes having a U-shaped optical path, wherein bellows are provided to enclose each leg of the path to form a shield and enclosure of substantially constant internal volume.

In the preferred construction, the bellows on each leg of the U-shaped support are divided into a number of sections connected together by flanges having perforations staggered relatively of one another and engageable selectively by pins or hooks attached to a sprocket chain or the like so as to control the extent of expansion of each bellows section and prevent any of the sections, and particularly the uppermost sections, from being expanded beyond a predetermined maximum.

The bellows may be constructed of any suitable material and their dimensions will, of course, depend upon the length and diameter of the optical path. Bellows of stainless steel having a thickness of the order of .006 inch have proven quite satisfactory.

One advantage of the present invention is that the bellows enclose only the optical path of the periscope while the hoisting mechanism and other moving parts are outside the enclosed air space.

Another advantage is that when the bellows are applied to U-shaped periscope bases, the volume enclosed thereby is constant for all positions of the periscope tube. As a result, pressure and condensation troubles due to the variations in pressure normally encountered are completely avoided.

Other advantages are that much smaller equipment is required to maintain the air surrounding the optical equipment at the proper state of desication, that moisture seeping past the periscope packing gland or oil from the mechanical parts are excluded from the optical path, and that the weight of the bellows arrangement is far less than that of the telescoping tube arrangement used heretofore.

These and other advantages, as well as the utility and objects of the invention, will become more apparent from the following description made with reference to the accompanying drawing wherein:

Figure 1 is a schematic side view of the complete periscope mount;

Figure 2 is a detailed part sectional view in elevation; and

Figure 3:
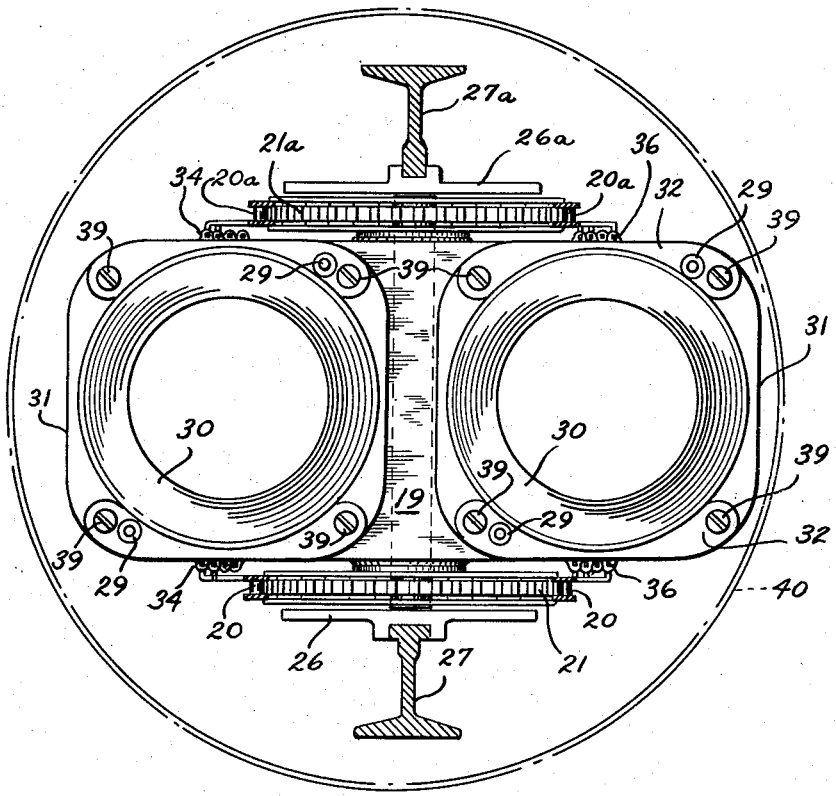
Figure 3 is a plan view taken along section line 3—3 of Figure 2.

A typical periscope, having a U-shaped optical path enclosed in accordance with the present invention, may include a periscope tube 10 projecting through the superstructure 11, and an eyepiece 12 in a viewing tube 13 mounted on a control deck 14, both tubes being open at their lower ends and containing optical elements. A first series of bellows 16 is attached to the underside of the periscope tube 10, a second series of bellows 17 is attached to the underside of the viewing tube 13, and a reflector housing 19 is attached to the lower ends of the first and second series of bellows. The housing 19 is supported by a pair of sprocket chains 20 and 20a passing over sprocket wheels 21 and 21a, Referring now more particularly to Figures 2 and 3, the reflector housing 19 supports two reflectors 22 and 24 positioned to reflect upwardly to the eyepiece 12 the rays of light passing downwardly through the telescope tube 10 and the first series of bellows 16. In addition to the sprocket wheels 21 and 21a already described, the housing 19 is provided with guides 26 and 26a slidable on vertical rails 27 and 27a. A plurality of guide pins 29 project from the upper portion of the housing to assist in guiding the bellows into non-buckling position when they are collapsed.

The bellows are divided into relatively short sections 30. Preferably each end of each section is provided with a flange 31. To the top of each flange 31 that is affixed to the lower end of a series of bellows there are fixed, by means of screws 39 or the like, a pair of upstanding elements 32 having perforated lugs 34 for engagement with a supporting pin 36 mounted on the sprocket chain 37, which in turn is fastened to the bottom of the telescope tube 10 and to the underside of the control deck 14. The perforated lugs 34 are staggered relatively of one another and the supporting pins 36, fixed to the sprocket chain 37 at equidistant intervals, are likewise staggered with relation to one another so that each supporting pin will engage only one selected perforated lug in each series of bellows.

The portion of the periscope mount below the control deck 14 may, if desired, be enclosed in a stationary tube 40 to protect the bellows against damage.

When the periscope tube 10 is in its projected position, the first series of bellows 16 is fully extended, as shown in solid lines in Figure 1, and the second series of bellows 17 is fully collapsed. When the periscope tube 10 is retracted, the movement of the sprocket chains 20 and 20a over the sprocket wheels 21 and 21a causes the housing 19 to move downwardly at one half the speed of the periscope tube 10. This causes the first series of bellows 16 to collapse and the second series of bellows 17 to expand until finally they assume the position shown in dotted lines in Figure 1. The supporting pin 36' engaging with the lowermost lug 34 in the first series of bellows 16 when the periscope tube 10 is in its projected position is the first to be withdrawn as the periscope tube 10 is lowered. After the lowermost section 30 of the first series of bellows is fully collapsed, the pin 36' passes around the sprocket wheel 21 and engages the second highest perforated lug 34 in the second series of bellows 17, the highest perforated lug in that series having already been engaged by its supporting pin 36. The remaining supporting pins act successively and in substantially the same manner so that as a series of bellows are contracted the lowermost bellows sections will be collapsed first, and as a series of bellows are extended, the uppermost sections will be extended first. The distance between the supporting pins 36 on the sprocket chain 20 and their selective engagement with the perforated lugs 34 prevents over-expansion on the part of any of the bellows sections and avoids having the weight of the lower bellows suspended from the upper bellows. As the supporting pins leave the collapsed bellows, the guide pins 29 operate to keep the otherwise unguided bellows in line.

It is obvious that the periscope mount described above is adaptable for use in many different types of periscopes and is not necessarily limited to the U-shaped periscope mounts. It is to be understood, therefore, that the form of the invention described herein is illustrative only and not intended to limit the scope of the following claims.

I claim:

1. A periscope comprising a fixed periscope tube section having an eyepiece at its upper end and an open lower end, a second periscope tube substantially parallel with the first tube and containing optical elements, said second tube being movable axially between a projected and a retracted position and having an open lower end, reflecting means including a housing therefor mounted movably below the lower ends of the tubes for reflecting light from the second tube to the first tube, means connecting the housing to the second tube for moving the reflecting means in the same direction as the second tube but at one-half the speed of the latter to maintain an optical path of constant length between the lower ends of said tubes, and separate collapsible and extensible bellows interposed between the housing and each of the lower ends of the tubes and communicating with each other, said bellows and housing forming an enclosure for the optical path, one of said bellows being extensible as the other collapses and both of said bellows being of substantially the same internal diameter to maintain the volume of said enclosure constant regardless of the movement of said second tube.

2. A periscope comprising a fixed periscope tube section having an eyepiece at its upper end and an open lower end, a second periscope tube substantially parallel with the first tube and containing optical elements, said second tube being movable axially between a projected and a retracted position and having an open lower end, reflecting means including a housing therefor mounted movably below the lower ends of said tubes for reflecting light from the second tube to the first tube, means connecting the housing to the second tube for moving the reflecting means with the second tube but at one-half the speed of the latter to maintain an optical path of constant length between said fixed tube and said second tube, separate series of collapsible and extensible bellows sections interposed between said housing and each of said lower ends of said tubes, said bellows sections and said housing communicating at their lower ends, said bellows sections and housing forming an enclosure for said optical path, said bellows sections being of essentially the same internal diameter to render the volume of said enclosure substantially constant regardless of the movement of said second tube, and means selectively and individually supporting each bellows section to limit its extension to a predetermined maximum.

3. A periscope comprising a fixed periscope tube section having an eyepiece at its upper end and an open lower end, a second periscope tube substantially parallel with the first tube and containing optical elements, said second tube being movable axially between a projected and a retracted position and having an open lower end, reflecting means mounted movably below the lower ends of the tubes for reflecting light from the second tube to the first tube, a sprocket wheel rotatable on said reflecting means, a sprocket chain connecting the reflecting means to the second tube for moving the reflecting means with the second tube but at one-half the speed of the latter, said chain having relatively staggered supporting members projecting therefrom, series of collapsible and extensible bellows sections interposed between the reflecting means and the lower ends of the tubes forming a shield and enclosure of substantially constant internal volume, flange members between adjacent bellows sections, said flange members having relatively staggered perforated lugs for selective engagement with the supporting members to limit the extension of the bellows sections to a predetermined maximum.

4. In a periscope having a periscope tube movable axially between a projected and a retracted position, a viewing tube provided with an eye piece, and a U-shaped optical path from the periscope tube to the eyepiece, the combination which comprises a reflector housing at the root of said U-shaped optical path for reflecting upwardly to the eyepiece the rays of light passing downwardly through the periscope tube, a first series of bellows enclosing the optical path between the periscope tube and the housing, a second series of bellows enclosing the optical path between the housing and the viewing tube, said first and second series of bellows being divided into a series of bellows sections, a plurality of annular flanges between said bellows sections and provided with relatively staggered perforated lugs, a sprocket wheel rotatably mounted on the housing, a sprocket chain passing around said sprocket wheel and fastened at one end to a relatively stationary support and at the other end to the periscope tube, said chain carrying a plurality of supporting pins staggered relative to one another for selective engagement with said perforated lugs, whereby said chain supports the housing and the fully extended bellows sections, and guide means on the housing for maintaining the bellows in axial alignment while in collapsed position.

5. In a periscope having a periscope tube movable axially between a projected and a retracted position, a viewing tube provided with an eyepiece, and a reflector below said tubes and forming therewith a U-shaped optical path from the periscope tube to the eyepiece, the combination which comprises a movable housing for said reflector, separate collapsible and extensible bellows of substantially equal internal diameters communicating with each other and enclosing the optical path between the periscope tube and the housing and between the housing and the viewing tube, and means connecting the reflector housing to the periscope tube for moving the housing with the periscope tube but at one-half the speed of the latter to extend one bellows and collapse the other at equal rates to maintain constant the volume of gas within said bellows.

6. In a periscope having a periscope tube movable axially between a projected and a retracted position, a viewing tube provided with an eyepiece, and a reflector below said tubes and forming therewith a U-shaped optical path from the periscope tube to the eyepiece, the combination which comprises a movable housing for said reflector at the root of said U-shaped optical path, a first bellows enclosing the optical path between the periscope tube and the reflector means, a second bellows enclosing the optical path between the reflector means and the viewing tube and communicating with said first bellows for flow of gas therebetween, means for moving said periscope tube and said housing in the same direction at different speeds to maintain the optical path constant in length and to collapse one bellows and extend the other to maintain the combined volumes of the bellows constant, and means for supporting the bellows to limit their expansion to a predetermined maximum.

7. A periscope comprising a fixed periscope tube section having an eyepiece at its upper end and an open lower end, a second periscope tube substantially parallel with the first tube and containing optical elements, said second tube being movable axially between a projected and a retracted position and having an open lower end, reflecting means mounted movably below the lower ends of the tubes for reflecting light from the second tube to the first tube, a sprocket wheel rotatable on said reflecting means, a sprocket chain connecting the reflecting means to the second tube for moving the reflecting means in the same direction as the second tube but at one-half the speed of the latter to maintain the optical path from said lower end to said eyepiece constant, first and second series of collapsible and extensible bellows sections interposed between the reflecting means and the lower ends of the first and second tubes, respectively, and forming first and second bellows of substantially equal internal diameters, said bellows communicating with each other through said housing and forming an enclosure of substantially constant internal volume in all positions of said second tube, and guide means on said bellows sections for engaging the sprocket chain and guiding the bellows sections to maintain them in axial alignment with the respective tubes.

8. In a periscope having a periscope tube movable axially between a projected and a retracted position, a viewing tube provided with an eyepiece, and a reflector below said tubes forming therewith a U-shaped optical path from the periscope tube to the eyepiece, the combination which comprises a movable housing for said reflector, a first series of bellows enclosing the optical path between the periscope tube and the housing, a second series of bellows enclosing the optical path between the housing and the viewing tube and communicating with said first series of bellows sections, said first and second series of bellows having substantially the same internal diameters and being divided into a series of bellows sections, a plurality of annular flanges between said bellows sections, a sprocket wheel rotatably mounted on the housing, a sprocket chain passing around said sprocket wheel and fastened at one end to a relatively stationary support and at the other end to the periscope tube to maintain the length of said optical path and the volume within said bellows sections constant in all positions of said periscope tube, and guide means on the annular flanges for maintaining the bellows in axial alignment with the periscope tube and the viewing tube.

ERNST O. KOLLMORGEN.

REFERENCES CITED

The following references are of record in the file of this patent:

UNITED STATES PATENTS

| Number | Name | Date |
| --- | --- | --- |
| 1,529,254 | Humbrecht | Mar. 10, 1925 |
| 1,624,733 | Humbrecht | Apr. 12, 1927 |

FOREIGN PATENTS

| Number | Country | Date |
| --- | --- | --- |
| 229,456 | Germany | Dec. 21, 1910 |
| 293,445 | Italy | Oct. 21, 1930 |